US005425229A

United States Patent [19]

van Ackeren et al.

[11] Patent Number: 5,425,229

[45] Date of Patent: Jun. 20, 1995

[54] PROCESS FOR UTILIZING THE ENERGY CONTAINED IN THE BLAST FURNACE GAS OF A SHAFT FURNACE

[75] Inventors: Paul van Ackeren, Duisburg; Karl-Heinz Schmitz, Tönisvorst, both of Germany

[73] Assignee: Mannesmann Aktiegesellschaft, Dusseldorf, Germany

[21] Appl. No.: 184,233

[22] Filed: Jan. 19, 1994

[30] Foreign Application Priority Data

Jan. 25, 1993 [DE] Germany ........................ 43 02 294.7
Jan. 25, 1993 [DE] Germany ........................ 43 13 662.1

[51] Int. Cl.[6] ............................ F02C 3/28; F02C 6/18

[52] U.S. Cl. .................................. 60/39.02; 60/39.12; 266/159

[58] Field of Search ................. 60/39.02, 39.07, 39.12, 60/39.511; 266/144, 147, 155, 157, 159

[56] References Cited

FOREIGN PATENT DOCUMENTS

3715188C2 5/1989 Germany .

OTHER PUBLICATIONS

Copy of Article of "Giesserei 76", 1989, Nr. 10/11 (pp. 328–335).

Copy of Article of "Giesserei 70", (1983), Nr. 16/17 (pp. 453–457).

*Primary Examiner*—Louis J. Casaregola
*Attorney, Agent, or Firm*—Cohen, Pontani, Lieberman, Pavane

[57] ABSTRACT

The energy contained in the blast furnace gas of a shaft furnace, particularly in the blast furnace gas of a cupola furnace, is utilized by wet cleaning the blast furnace waste gas as it emerges from the shaft furnace. The pre-treated blast furnace gas is then fed to a fine-dust filter for purification. Blast furnace gas entering the fine-dust filter is heated to the dew point by mixing it with a partial flow of purified gas branched off and heated upon exiting the fine-dust filter. Another portion of the purified gas mixture is fed to a gas turbine.

6 Claims, 1 Drawing Sheet

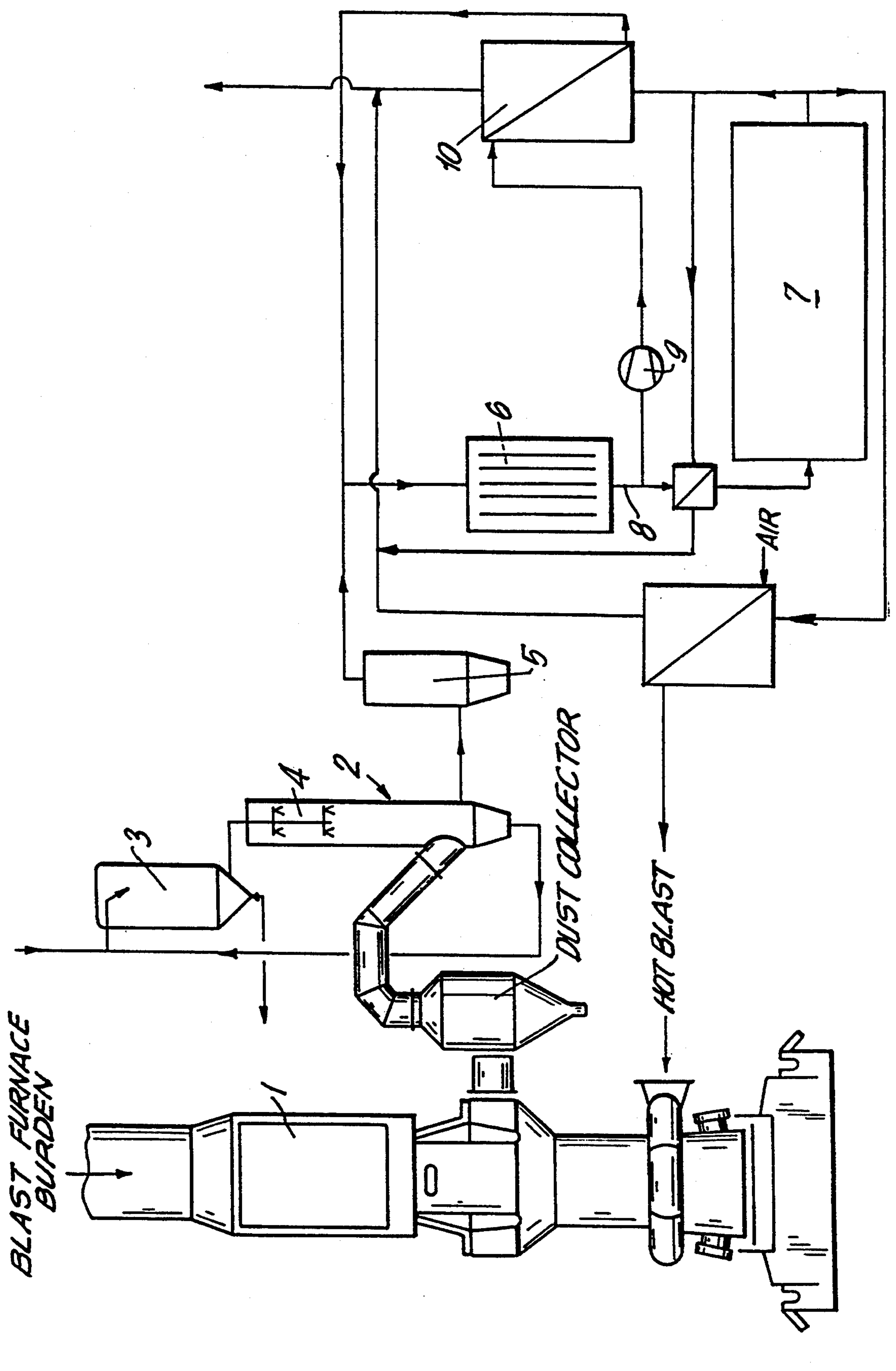
BLAST FURNACE BURDEN
1
2
3
4
5
6
7
8
9
10
DUST COLLECTOR
HOT BLAST
AIR

PROCESS FOR UTILIZING THE ENERGY CONTAINED IN THE BLAST FURNACE GAS OF A SHAFT FURNACE

BACKGROUND OF THE INVENTION

1. Field of The Invention

This invention relates generally to methods for utilizing the energy present in foundry blast furnace gases and, more particularly, to a process for utilizing the latent heat of gases developed within a cupola furnace or other shaft furnaces having correspondingly high gas temperatures.

2. Description of The Prior Art

The energy expenditure in ore reduction is considerable; the blast furnace itself uses about 66% of the total energy of a metallurgical plant for the production of crude iron. Approximately 3000 $Nm^3$ of air are required for the burning of one ton of coke. Efforts to conserve heat energy during such a process have been principally directed toward decreasing amounts necessary for processing using coke gas, natural gas, blast furnace gas, heating oil, etc. Another purpose sought to be accomplished by such conservation methods is the utilization of the heat of exhaust gases of metallurgical processes to support the production of high temperatures for the extraction of metal. More specifically, in the production of crude iron and steel it is possible and highly desirable to increase the economy of the metallurgical process by using higher input temperatures of the processing gases.

It is also known that a portion of the heat present in blast furnace gas may be recovered using heat pipe recuperators. Heat recovered in this manner is typically used to provide hot air or hot water to a disintegrator or a venturi washer, respectively. Thereafter, the blast furnace gas is wet-cleaned to eliminate the pyrophoric properties of the dust particles contained therein.

Alternatively, the blast furnace gas may instead be burned as raw gas in a combustion chamber during generation of the hot blast used to operate the furnace. As the dust particles are no longer pyrophoric following combustion, only dry-cleaning of the blast furnace gas is required. In accordance with such prior art techniques, any blast furnace gas which is not needed for hot blast generation is released into the atmosphere via the chimney, thereby wasting the heat energy contained therein.

Techniques for making more efficient use of the heat present in the waste blast furnace gas have been proposed. For example, it has been proposed to utilize the blast furnace gas not needed for hot blast generation to generate electrical current in a steam power station connected downstream.

For a more detailed description of this technique, reference may be had, for example, to an article by E. Freuntsh and A. Rudolph entitled "Concept for a Modern Hot Blast Cupola Furnace Installation", Zeitschrift Gesseri 76, 1989, No. 10/11. There are, however, several disadvantages associated with this technique. Because of the relatively small size of most foundry cupola furnaces, the generating capacity of the associated turbine is limited to 1.5 to 3.0 MW, at best. As such, the initial investment required to purchase and install the necessary generating equipment may be prohibitively expensive, or the period required to recover such an investment may be unacceptably long. Moreover, less modern plants often have insufficient space to accommodate the elaborate equipment needed to generate electricity from steam.

It is therefore an object of the present invention to provide a process for efficiently utilizing the latent heat of shaft furnace gas, thereby substantially reducing the amount of heat released into the atmosphere.

It is a further object of the present invention to provide a process which is space-efficient as well as economical to install and operate.

SUMMARY OF THE INVENTION

In accordance with the present invention, blast furnace gas emerging from a cupola or shaft furnace is pre-treated by subjecting it to wet pre-cleaning in a washer in order to eliminate the pyrophoric properties of the dust. The blast furnace is then cooled sufficiently to avoid damaging a fine-dust filter through which the gas will later be directed. The pre-treated blast furnace gas is passed through a mist collector and subsequently fed to the aforementioned fine-dust filter. Preferably, the fine-dust filter is constructed as a laminate-coated tube filter.

A gas turbine is provided to exploit the latent heat contained in the purified gas leaving the filter. At start-up, external fuel is supplied to the gas turbine. Waste gas leaving the turbine is then passed through a conventional heat exchanging device such as a recuperator and used to heat a branched off flow or first portion of the purified gas furnace gas leaving the filter. In order to ensure adequate heating of the branched off flow by the recuperator, a supplementary external heat source may be utilized if necessary. The branching off of the first portion takes place between the fine dust filter and the gas turbine. In this manner, the branched-off flow is heated to a temperature above the dew point and mixed with the blast furnace gas about to enter the filter. The heating of the gas which is effected by mixing the filtered and unfiltered gases is necessary because the dust particles present in the unfiltered gas would otherwise be wet, causing the filter to clog and, thereby, become inoperable. Another branched off flow or second portion of the purified gas :leaving the filter is fed directly to the gas turbine for use therein.

If desired, a partial gas flow of the gas exiting the turbine can be mixed with the filtered gas about to enter the turbine to provide pre-heating of the filtered gas. Additionally, the portion of the gas exiting the turbine and used in the recuperator can be further used to preheat the shaft furnace hot blast so that optimal use is made of the heat present in the turbine waste gas.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

BRIEF DESCRIPTION OF THE DRAWING

The above objects, further features and advantages of the invention are described in detail below in conjunction with the drawing which shows a flow chart of the process for utilizing the energy contained in the blast furnace gas of a cupola furnace according to the present invention.

DETAILED DESCRIPTION OF THE PREFERRED EMBODIMENTS

It should be noted initially that "cupola furnace", where mentioned herein, is contemplated to include any shaft furnace having a low stack or shaft and correspondingly high blast furnace gas temperatures (up to 600° C.). With reference now to the Figure, there is shown a cupola furnace 1 which produces during operation a stream of blast furnace gas. If desired, the sensible heat of the blast furnace gas may be utilized to heat hot blast about to enter furnace 1.

In any event, in order to eliminate the pyrophoric properties of the dust present in the exiting blast furnace gas, the gas stream is first fed to a washing device 2 for pre-cleaning. Water is recirculated through a sludge separator 3 and injected into washing device 2 via nozzles 4. The water injected into washer 2 is sprayed in a direction opposite to the flow of blast furnace gas therethrough. As will be readily ascertained by those skilled in the art, water containing dust particles collects in the lower region of washer 2 and is removed and supplied to sludge separator 3. Within sludge separator 3, the dust particles suspended within the water are removed so that the water may be reintroduced into washing device 2.

After passing through washer 2, the blast furnace gas is fed to a conventional mist collector 5 for removal of any mist which may remain as a result of the pre-cleaning process.

Blast furnace gas leaving mist collector 5 is then passed through a fine-dust filter 6 for removal of smaller dust particles not removed by washing. In a manner which will be explained later, the blast furnace gas;is heated to a temperature above its dew point before it enters fine-dust filter 6 to avoid clogging thereof with wet dust particles. An increase in temperature of 20° C. to 30° C. to approximately 40° C. to 50° C. is generally sufficient for this purpose.

After the gas mixture has been purified in the fine-dust filter 6, a portion of it is fed to a gas turbine 7 which utilizes the gas to generate electrical power. Accordingly, the blast furnace gas must be fine-cleaned in dust filter 6 to gas turbine purity (i.e., less than 0.1 mg dust/m$^3$). For this purpose, filter tubes which are coated with PTFE laminate and which ensure the extremely low dust content in the purified gas are preferably utilized within filter 6. Periodic cleaning of the tubes can be effected by using the pulse jet method (e.g., with natural gas or turbine exhaust gas).

As indicated above, the blast furnace gas must be heated to a temperature above the dew point before it is introduced into filter 6. In accordance with the present invention, this is advantageously accomplished by branching off a portion of the flow leaving the filter directly after the filter outlet 8 and feeding the same to a recuperative heat exchanger 10 using a fan. Preferably, waste gas exiting gas turbine 7 is utilized by recuperator 10 as a source of heat. However, if desired, additional sources of heat (not shown) may be utilized.

In addition to its use as a source of heat for recuperator 10, the waste gas exiting turbine 7 may also be used to pre-heat the fine filtered gas mixture exiting filter 6 as it is about to enter the turbine as well as to supplement the heating of hot blast entering furnace 1. In accordance with the present invention, the gas turbine itself has an output in excess of 2 MW and achieves an efficiency of 26% in this range. It will be readily appreciated by those skilled in the art that the available blast furnace gas can be increased by using extra fuel to the extent that a gas turbine output in excess of 2 MW may be achieved even in smaller shaft furnaces, particularly cupola furnaces. Extra fuel is required in any event for starting up the overall operation and for compensating for fluctuations in the blast furnace gas availability.

Although the present invention has been described in detail, it should be understood that various changes, substitutions, and alterations can be made herein without departing from the spirit and scope of the invention as defined by the appended claims.

The invention is not limited by the embodiments described above which are presented as examples only but can be modified in various ways within the scope of protection defined by the appended patent claims.

We claim:

1. A process for utilizing the energy contained in the blast furnace gas of a shaft furnace, comprising the steps of:

wet-cleaning blast furnace gas emerging from said shaft furnace in a washer:

passing the blast furnace gas through a fine-dust filter after said pre-cleaning step to obtain a purified gas mixture;

heating a first portion of said purified gas mixture in a recuperator;

heating blast furnace gas to be purified to a temperature above the dew point by mixing said first portion with blast furnace gas about to enter said fine-dust filter;

introducing a second portion of said purified gas mixture into a gas turbine; and feeding waste gas exiting the gas turbine to said recuperator.

2. A process according to claim 1, further comprising pre-heating shaft furnace blast air using a partial flow of waste gas exiting the gas turbine.

3. A process according to claim 1, further comprising pre-heating said second portion before it enters said gas turbine with a portion of waste gas exiting the gas turbine.

4. A process according to claim 1, wherein said filter is a tube filter.

5. A process according to claim 1, wherein said blast furnace gas contains less than 0.1 mg dust/m$^3$ after said passing step.

6. A process according to claim 1, wherein said blast furnace gas is fed through a mist collector prior to said passing step.

* * * * *